US012705896B2

(12) United States Patent
Date et al.

(10) Patent No.: US 12,705,896 B2
(45) Date of Patent: Aug. 11, 2026

(54) MONITORING DEVICE, MONITORING METHOD, AND PROGRAM

(71) Applicant: KEISUUGIKEN CORPORATION, Osaka (JP)

(72) Inventors: Hisanori Date, Hyogo (JP); Naohiro Hayaishi, Osaka (JP)

(73) Assignee: KEISUUGIKEN CORPORATION, Osaka (JP)

( * ) Notice: Subject to any disclaimer, the term of this patent is extended or adjusted under 35 U.S.C. 154(b) by 876 days.

(21) Appl. No.: 17/776,402

(22) PCT Filed: Sep. 15, 2020

(86) PCT No.: PCT/JP2020/034939
§ 371 (c)(1),
(2) Date: Nov. 14, 2022

(87) PCT Pub. No.: WO2021/095351
PCT Pub. Date: May 20, 2021

(65) Prior Publication Data

US 2023/0061044 A1 Mar. 2, 2023

(30) Foreign Application Priority Data

Nov. 13, 2019 (JP) ................................ 2019-205766

(51) Int. Cl.
*G06K 9/00* (2022.01)
*G06T 7/00* (2017.01)
(Continued)

(52) U.S. Cl.
CPC ............ *G06V 20/52* (2022.01); *G06T 7/0002* (2013.01); *G06V 10/764* (2022.01);
(Continued)

(58) Field of Classification Search
CPC ............................ G06V 20/52; G06V 10/764
See application file for complete search history.

(56) References Cited

U.S. PATENT DOCUMENTS 7,433,493 B1 10/2008 Miyoshi et al.
9,904,868 B2 2/2018 Ruan et al.
(Continued)

FOREIGN PATENT DOCUMENTS

JP 2000293685 A 10/2000
JP 2010238028 A 10/2010
(Continued)

OTHER PUBLICATIONS

Yoshiyuki Kobayashi et al., "Assessment of Abnormal Detection Technology Aimed for the Clarification of the Causes of Falls in Public Area", Japanese journal of fall prevention, 1(1), p. 55-63, Jun. 2014.

(Continued)

*Primary Examiner* — Molly Wilburn
*Assistant Examiner* — Aidan Keup
(74) *Attorney, Agent, or Firm* — Troutman Pepper Locke LLP

(57) ABSTRACT

The monitoring device includes a captured image acquisition unit that captures a captured image of a monitoring target, a determination unit that determines a type of the monitoring target included in the captured image, an abnormality detection unit that detects an abnormality by applying the captured image to a monitoring model corresponding to the type of the monitoring target determined by the determination unit, the monitoring model being used to detect an abnormality related to the monitoring target included in the captured image, and an output unit that, when the abnormality is detected by the abnormality detection unit, performs an output related to detection of the abnormality. With (Continued)

such a configuration, it is possible to detect an abnormality using the monitoring model corresponding to the type of the monitoring target included in the captured image, and it is possible to perform abnormality detection according to the actually captured monitoring target.

8 Claims, 6 Drawing Sheets

(51) Int. Cl.

| | |
|---|---|
| ***G06V 10/764*** | (2022.01) |
| ***G06V 10/774*** | (2022.01) |
| ***G06V 20/52*** | (2022.01) |
| ***G10L 25/51*** | (2013.01) |

(52) U.S. Cl.

CPC ............ *G06V 10/774* (2022.01); *G10L 25/51* (2013.01); *G06T 2207/20081* (2013.01); *G06T 2207/30232* (2013.01)

(56) References Cited

U.S. PATENT DOCUMENTS

| | | | | |
|---|---|---|---|---|
| 10,706,515 | B2 | 7/2020 | Urashita | |
| 11,210,526 | B2 | 12/2021 | Hisada et al. | |
| 2012/0134532 | A1 | 5/2012 | Ni et al. | |
| 2014/0043480 | A1 | 2/2014 | Wu | |
| 2017/0223314 | A1* | 8/2017 | Collings, III | G06V 10/25 |
| 2020/0090314 | A1* | 3/2020 | Mayr | G06F 18/40 |
| 2020/0334448 | A1* | 10/2020 | Ghazaryan | G06V 10/82 |
| 2021/0027485 | A1* | 1/2021 | Zhang | G06T 7/11 |
| 2021/0307621 | A1* | 10/2021 | Svenson | A61B 5/015 |

FOREIGN PATENT DOCUMENTS

| | | | |
|---|---|---|---|
| JP | 2014512768 | A | 5/2014 |
| JP | 2016110263 | A | 6/2016 |
| JP | 2017068815 | A | 4/2017 |
| JP | 2017091530 | A | 5/2017 |
| JP | 2017225122 | A | 12/2017 |
| JP | 2018073024 | A | 5/2018 |
| JP | 2018173914 | A | 11/2018 |
| JP | 6534499 | B1 | 6/2019 |
| WO | 2002021441 | A1 | 3/2002 |
| WO | 2015122161 | A1 | 8/2015 |
| WO | 2020/189313 | A1 | 9/2020 |

OTHER PUBLICATIONS

Amarjot Singh et al., “Eye in the Sky: Real-time Drone Surveillance System (DSS) for Violent Individuals Identification using ScatterNet Hybrid Deep Learning Network”, IEEE Conference on Computer Vision and Pattern Recognition (CVPR) 2018.

Notice of Reasons for Refusal dated Feb. 25, 2020, from corresponding No. JP2019-205766.

International Search Report issued in corresponding International Patent Application No. PCT/JP2020/034939 dated Dec. 8, 2020, with English translation.

* cited by examiner

FIG. 5A
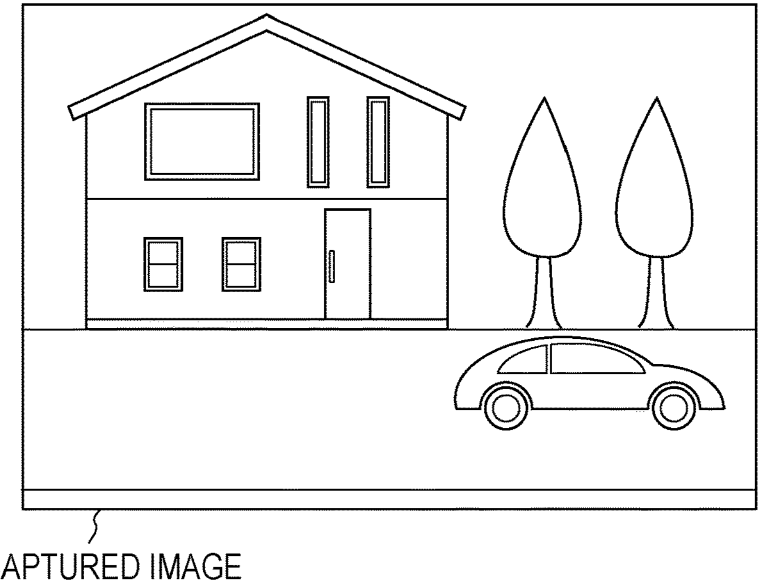
FIG. 5B
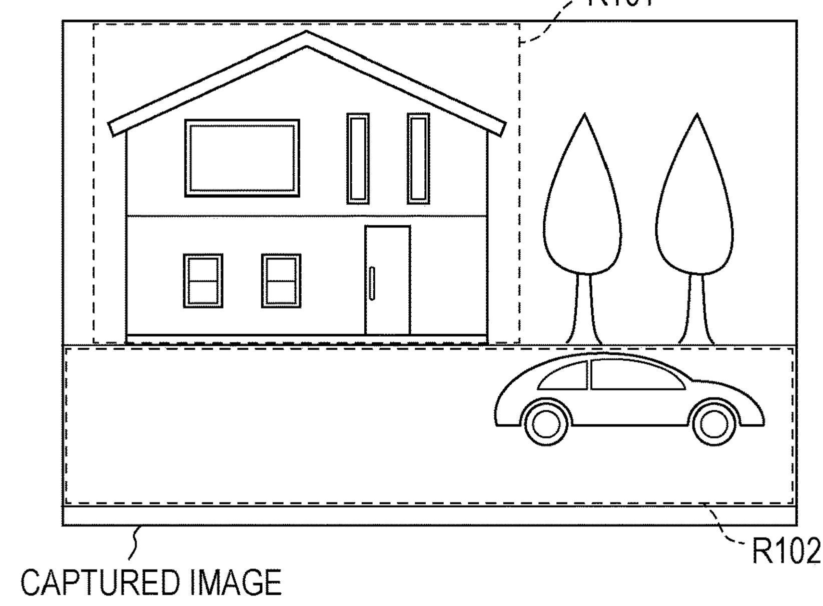
FIG. 6A
| TYPE OF MONITORING TARGET | MODEL IDENTIFIER |
|---|---|
| ROAD | M001 |
| HOUSE (INSIDE) | M002 |
| HOUSE (OUTSIDE) | M003 |
| SHOPPING STREET | M004 |
| ⋮ | ⋮ |

| MONITORING TARGET | | MODEL IDENTIFIER |
|---|---|---|
| TYPE | ATTRIBUTE | |
| ROAD | ONE LANE | M101 |
| | TWO LANES | M102 |
| | FOUR LANES | M103 |
| | ⋮ | ⋮ |
| HOUSE (INSIDE) | LIVING ROOM | M201 |
| | KITCHEN | M202 |
| | STAIRS | M203 |
| | ENTRANCE | M204 |
| | ⋮ | ⋮ |
| ⋮ | ⋮ | ⋮ |

FIG. 8A

| TYPE OF MONITORING TARGET | ABNORMALITY OF DETECTION TARGET |
|---|---|
| ROAD | TUMBLING |
| | TRAFFIC ACCIDENT |
| | RIOTS |
| | FIRES |
| | ⋮ |
| HOUSE (INSIDE) | TUMBLING |
| | FIRES |
| | ⋮ |
| ⋮ | ⋮ |

CORRESPONDENCE INFORMATION

FIG. 8B

| ABNORMALITY OF DETECTION TARGET | MODEL IDENTIFIER |
|---|---|
| TUMBLING | M301 |
| TRAFFIC ACCIDENT | M302 |
| RIOTS | M303 |
| FIRES | M304 |
| SHOPLIFTING | M305 |
| TORNADOS | M306 |
| ⋮ | ⋮ |

FIG. 9

| CERTAINTY FACTOR (%) | OUTPUT DESTINATION |
|---|---|
| 90% OR MORE | 06-1234-****<br>090-9876-**** |
| 60% OR MORE AND LESS THAN 90% | 090-9876-**** |

911 MPU

912 ROM

913 RAM

915 WIRELESS COMMUNICATION MODULE

916

11 CAPTURED IMAGE ACQUISITION UNIT

MONITORING DEVICE, MONITORING METHOD, AND PROGRAM

CROSS-REFERENCE TO RELATED APPLICATIONS

This application is a U.S. National Phase of International Patent Application No. PCT/JP2020/034939, filed on 15 Sep. 2020, which claims priority of Japanese Patent Application No. 2019-205766 filed 13 Nov. 2019. The entire contents of these applications are incorporated herein by reference in their entirety.

TECHNICAL FIELD

The present invention relates to a monitoring device or the like that detects an abnormality related to a monitoring target included in a captured image using a model for detecting an abnormality.

BACKGROUND

Conventionally, a traffic accident or smoke is automatically detected using a captured image (See, for example, JP 2016-110263 A). Therefore, for example, in a case where a monitoring target is determined, by using such a conventional technique, it is possible to detect a traffic accident or detect smoke from a captured image, and it is possible to quickly respond to a traffic accident or a fire.

SUMMARY

However, in the above-described conventional technique, since a device to be used is different for each abnormality of a detection target, such as a device for detecting a traffic accident is used for detecting a traffic accident and a device for detecting smoke is used for detecting a fire, it is necessary to prepare a device according to a purpose of monitoring, which is complicated.

The present invention has been made to solve the above problem, and an object of the present invention is to provide a device and the like capable of appropriately detecting an abnormality corresponding to a type of a monitoring target included in a captured image among a plurality of types of monitoring targets.

In order to achieve the above object, a monitoring device according to the present invention includes: a captured image acquisition unit that captures a captured image of a monitoring target; a determination unit that determines a type of the monitoring target included in the captured image captured by the captured image acquisition unit by applying the captured image to a learning device for image classification; an abnormality detection unit that detects an abnormality by applying the captured image captured by the captured image acquisition unit to a monitoring model corresponding to the type of the monitoring target determined by the determination unit, the monitoring model being used to detect an abnormality related to the monitoring target included in the captured image; and an output unit that, when the abnormality is detected by the abnormality detection unit, performs an output related to detection of the abnormality.

With such a configuration, it is possible to automatically detect an abnormality using the monitoring model corresponding to the type of the monitoring target included in the captured image. Therefore, for example, even in a case where the monitoring target is undetermined until the device is installed, it is possible to perform abnormality detection according to the actually captured monitoring target.

Further, the monitoring device according to the present invention may further include a model acquisition unit that acquires a monitoring model corresponding to the type of the monitoring target determined by the determination unit from a server that holds a plurality of monitoring models, wherein the abnormality detection unit detects an abnormality using the monitoring model acquired by the model acquisition unit.

With such a configuration, it is not necessary to hold a plurality of monitoring models corresponding to a plurality of types of monitoring targets in advance in the device, and a capacity of a memory or the like for holding the monitoring models may be small.

Further, in the monitoring device according to the present invention, when the determination unit determines that a plurality of the types of the monitoring targets are included in the captured image, the abnormality detection unit mat detect an abnormality using a plurality of monitoring models respectively corresponding to the plurality of types of monitoring targets that are determination results.

With such a configuration, it is possible to detect an abnormality corresponding to each of the plurality of types of monitoring targets included in the captured image.

Furthermore, in the monitoring device according to the present invention, when the determination unit determines that a plurality of the types of the monitoring targets are included in the captured image, the abnormality detection unit may detect, for each part of the captured image corresponding to each of the types of the monitoring targets that are determination results, an abnormality using a monitoring model corresponding to the type of the monitoring target.

With such a configuration, since the abnormality is detected for each part of the captured image corresponding to each of the types of the monitoring targets using the monitoring model corresponding to the type, it is possible to detect the abnormality with higher accuracy.

Furthermore, in the monitoring device according to the present invention, the monitoring model corresponds to an abnormality of a detection target, the monitoring device further includes a correspondence information storage unit that stores a plurality of pieces of correspondence information for associating a type of the monitoring target with an abnormality of one or more detection targets, and the abnormality detection unit may detect an abnormality using one or more monitoring models associated by the correspondence information with the type of the monitoring target determined by the determination unit.

With such a configuration, it is possible to detect various abnormalities of the monitoring target by preparing the monitoring model for each abnormality of the detection target. Therefore, there is an advantage that preparation of the monitoring model becomes easier.

Further, in the monitoring device according to the present invention, the monitoring model may be a learning device learned using a plurality of sets of training input information that is a captured image and training output information indicating presence or absence of an abnormality related to a monitoring target included in the captured image of the training input information.

With such a configuration, it is possible to detect an abnormality by using the learning device that is a learning result.

Further, in the monitoring device according to the present invention, the output unit may perform different outputs according to a certainty factor corresponding to the abnormality detected by the abnormality detection unit.

With such a configuration, for example, in a case where the certainty factor is low, it is possible to perform an output only to a specific administrator or the like, and in a case where the certainty factor is high, it is possible to perform an output also to a public institution such as a police department or a fire department, and it is possible to more appropriately respond to the occurrence of abnormality.

Further, in the monitoring device according to the present invention, the captured image also includes sound, and the abnormality detection unit may detect an abnormality by also using the sound included in the captured image.

With such a configuration, it is possible to detect a wider range of abnormalities by also using the sound.

Furthermore, a monitoring method according to the present invention includes: a step of capturing a captured image of a monitoring target; a step of determining a type of a monitoring target included in the captured image captured in the step of capturing the captured image by applying the captured image to a learning device for image classification; a step of detecting an abnormality by applying the captured image captured in the step of capturing the captured image to a monitoring model corresponding to the type of the monitoring target determined in the step of determining the type of the monitoring target, the monitoring model being used to detect an abnormality related to the monitoring target included in the captured image; and a step of, when the abnormality is detected in the step of detecting the abnormality, performing an output related to detection of the abnormality.

According to the monitoring device or the like of the present invention, the abnormality can be detected using the monitoring model corresponding to the type of the monitoring target included in the captured image among the plurality of types of monitoring targets.

BRIEF DESCRIPTION OF THE DRAWINGS

FIG. 5A is a diagram illustrating an example of a captured image according to the exemplary embodiment.

FIG. 5B is a diagram illustrating an example of a part corresponding to a type of a monitoring target in the captured image according to the exemplary embodiment.

FIG. 6A is a diagram illustrating an example of correspondence between a type of a monitoring target and a model identifier according to the exemplary embodiment.

FIG. 8A is a diagram illustrating an example of correspondence information according to the exemplary embodiment.

FIG. 8B is a diagram illustrating an example of correspondence between an abnormality of a detection target and a model identifier according to the exemplary embodiment.

FIG. 9 is a diagram illustrating an example of correspondence between a certainty factor and an output destination in the exemplary embodiment.

FIG. 10 is a diagram illustrating an example of a configuration of a computer system according to the exemplary embodiment.

DETAILED DESCRIPTION

Hereinafter, a monitoring device according to the present invention will be described with reference to an exemplary embodiment. Note that, in the following exemplary embodiment, components and steps denoted by the same signs are the same or equivalent, and the description thereof may be omitted again. A monitoring device according to the present exemplary embodiment determines a type of a monitoring target included in a captured image, and detects an abnormality by using a model corresponding to a result of the determination.

Figure 1:
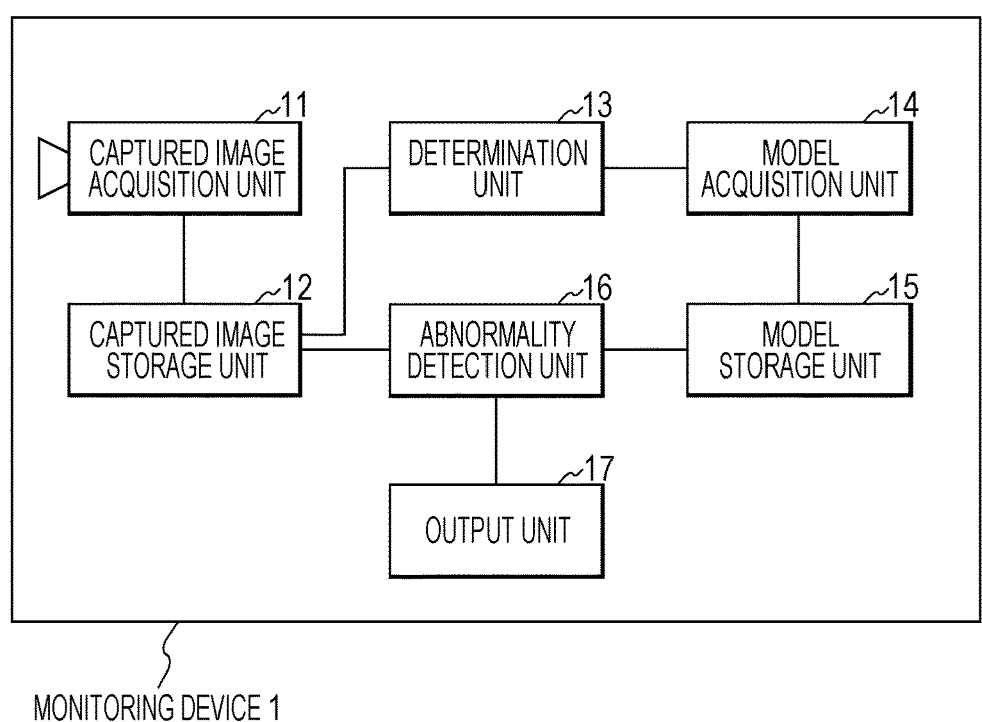
FIG. 1 is a block diagram illustrating a configuration of a monitoring device according to an exemplary embodiment of the present invention.
Figure 4:
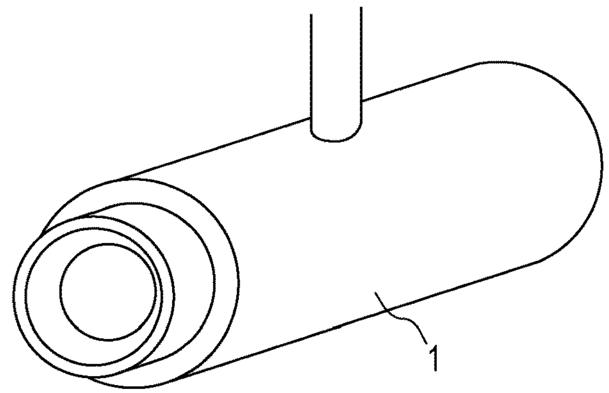
FIG. 4 is an external view illustrating an example of the monitoring device according to the exemplary embodiment.

FIG. 1 is a block diagram illustrating a configuration of monitoring device 1 according to the present exemplary embodiment. The monitoring device 1 according to the present exemplary embodiment includes a captured image acquisition unit 11, a captured image storage unit 12, a determination unit 13, a model acquisition unit 14, a model storage unit 15, an abnormality detection unit 16, and an output unit 17. For example, as illustrated in FIG. 4, the monitoring device 1 may be a device integrally configured with a monitoring camera, or may be a device that acquires a captured image from the monitoring camera and performs processing related to abnormality detection. In the present exemplary embodiment, the former case will be mainly described.

The captured image acquisition unit 11 acquires a captured image of a monitoring target. From the viewpoint of performing continuous monitoring, the captured image is preferably repeatedly acquired. The captured image may be a frame included in a moving image. The monitoring target is a target for abnormality detection, and may be, for example, a road, an outside of a building, an inside of a building, a shopping street, a river, a sea, a mountain, or the like. The captured image may be, for example, a color image or a grayscale image, but is preferably a color image from the viewpoint of realizing more accurate abnormality detection. Further, the captured image may or may not include sound, for example. In a case where the captured image includes sound, for example, the image and the sound included in the captured image may be synchronized with each other.

For example, the captured image acquisition unit 11 may acquire a captured image by an optical device such as a camera, or may receive a captured image acquired by an optical device such as a camera. In a case where the captured image acquisition unit 11 acquires the captured image by the optical instrument and the captured image also includes sound, the captured image acquisition unit 11 may acquire the sound by a microphone or the like. The sound is preferably a sound generated in the vicinity of a capturing target. When the captured image acquisition unit 11 receives the captured image, the reception may be reception of the captured image transmitted via a communication line. In the present exemplary embodiment, a case where the captured image acquisition unit 11 acquires a captured image by an optical device such as a camera will be mainly described.

The captured image acquired by the captured image acquisition unit 11 is accumulated in the captured image storage unit 12.

The captured image is stored in the captured image storage unit 12. Note that, as described above, since the captured images are in chronological order, it is preferable that the captured images are stored in the captured image storage unit 12 so that the latest captured image can be specified. The captured image storage unit 12 is preferably realized by a nonvolatile recording medium, but may be realized by a volatile recording medium. The recording medium may be, for example, a semiconductor memory, a magnetic disk, or the like.

The determination unit 13 determines the type of the monitoring target included in the captured image acquired by the captured image acquisition unit 11. The type of the monitoring target may be, for example, a road, an outside of a building, an inside of a building, a shopping street, a river, a sea, a mountain, or the like. Specifically, when the captured image includes a road, the determination unit 13 may determine that the type of the monitoring target included in the captured image is a road. Further, when the captured image includes a plurality of types of monitoring targets, the determination unit 13 may determine that the captured image includes a plurality of types of monitoring targets. Specifically, when the captured image includes a road and a house, the determination unit 13 may determine that the types of the monitoring target included in the captured image are the road and the house. The determination result by the determination unit 13 may be, for example, information indicating the type of the monitoring target included in the captured image.

For example, the determination unit 13 may determine the type of the monitoring target included in the captured image by applying the captured image to a learning device for image classification. In this case, for example, the determination unit 13 may determine that the captured image is an image of a road or may determine that the captured image is an image of a building. In this way, it is determined that the type of the monitoring target included in the captured image is a road or a building. This learning device may be, for example, a learning result of a convolutional neural network (Neural Network) or a learning result of another machine learning. Further, in such determination, when certainty factors (likelihoods) corresponding to the plurality of classification results exceed predetermined threshold values, the determination unit 13 may determine that the number of types of the monitoring target included in the captured image is plural. Specifically, when the certainty factor of the classification result that the captured image is an image of a road exceeds the threshold value, and the certainty factor of the classification result that the captured image is an image of a building also exceeds the threshold value, the determination unit 13 may determine that the types of the monitoring target included in the captured image are a road and a building. A learning device that performs such image classification is already known, and a detailed description thereof will be omitted. Furthermore, in a case where the determination is performed using the learning device, the determination unit 13 may perform the determination using the learning device stored in a storage unit (not illustrated).

In addition, the determination unit 13 may determine the type of the monitoring target included in the captured image by performing image segmentation on the captured image. The image segmentation is processing of assigning a predetermined label (for example, a road, a building, a tree, or the like) to each pixel of the captured image. Therefore, it is possible to specify a labeled region in the captured image by the image segmentation. As a result, for example, in a case where a label of a certain monitoring target is given to the captured image, it can be determined that the type of the monitoring target is included in the captured image. Note that, as a result of the image segmentation on the captured image, the determination unit 13 may determine that the type of the monitoring target corresponding to the label assigned to more than the predetermined number of pixels is included in the captured image. Specifically, when the labels assigned to the pixels exceeding the predetermined number are the road and the building in the result of the image segmentation on the captured image, the determination unit 13 may determine that the types of the monitoring target included in the captured image are the road and the building. A learning device that performs such image segmentation is already known, and a detailed description thereof will be omitted. Note that the teaming device that performs image segmentation may be, for example, a teaming result of a neural network having a plurality of convolution layers in a preceding stage and having one or more enlargement layers for enlarging an image in a subsequent stage, or may be a learning result of machine learning with other configurations. The enlargement layer may be, for example, an unpooling layer, a deconvolution layer, or the like.

Note that the timing at which the determination by the determination unit 13 is performed is not limited. For example, in a case where photographing is performed by a fixed camera, the determination result does not change, and thus determination by the determination unit 13 may be performed only once before abnormality detection. On the other hand, for example, in a case where imaging is performed by a movable camera (for example, an automobile, a flying object such as a drone, a camera mounted on a moving object such as a monitoring robot, and the like), there is a possibility that the determination result changes, and thus, the determination by the determination unit 13 may be repeatedly performed.

The model acquisition unit 14 acquires a monitoring model corresponding to the type of the monitoring target determined by the determination unit 13 from a server (not illustrated) that holds a plurality of monitoring models. The monitoring model is a model used to detect an abnormality related to a monitoring target included in a captured image. Details of the monitoring model will be described later. As described later, when the type of the monitoring target is associated with model identifier for identifying the monitoring model, the model acquisition unit 14 may specify the model identifier corresponding to the type of the monitoring target that is a determination result by the determination unit 13, transmit a transmission instruction to the server to transmit the monitoring model identified by the specified model identifier, and receive the monitoring model from the server in response to the transmission. The acquired monitoring model is accumulated in the model storage unit 15. Note that the server that transmits instructed information in response to a transmission instruction is publicly known, and a detailed description thereof will be omitted.

Note that for example, one monitoring model may correspond to one type of the monitoring target, or two or more monitoring models may correspond to one type of the monitoring target. In the latter case, the model acquisition unit 14 may acquire two or more monitoring models corresponding to one type of the monitoring target determined by the determination unit 13. When the determination unit 13 determines that the captured image includes a plurality of types of monitoring targets, the model acquisition unit 14 may acquire monitoring models respectively corresponding to the plurality of types of monitoring targets.

Further, in a case where the determination is performed only once or in a case where the determination result does not change, the model acquisition unit 14 only needs to acquire the monitoring model once. On the other hand, when the determination result changes, the model acquisition unit 14 may repeat the acquisition of the monitoring model according to the changed determination result.

The model storage unit 15 stores the monitoring model acquired by the model acquisition unit 14. The model storage unit 15 is preferably realized by a nonvolatile recording medium, but may be realized by a volatile recording medium. The recording medium may be, for example, a semiconductor memory, a magnetic disk, or the like.

The abnormality detection unit 16 detects an abnormality by applying the captured image acquired by the captured image acquisition unit 11 to the monitoring model corresponding to the type of the monitoring target determined by the determination unit 13. Further, in a case where the number of types of the monitoring target determined to be included in the captured image by the determination unit 13 is plural, the abnormality detection unit 16 detects an abnormality using a plurality of monitoring models respectively corresponding to the plurality of types of monitoring targets which are determination results. That is, the abnormality detection unit 16 may detect an abnormality by applying the captured image to each of the plurality of monitoring models. The captured image applied to the monitoring model may be one captured image or a plurality of captured images. In the latter case, it is preferable that a plurality of temporally continuous captured images, that is, moving images, are applied to the monitoring model. Note that, in the present exemplary embodiment, since the monitoring model corresponding to the type of the monitoring target determined by the determination unit 13 is acquired by the model acquisition unit 14 and stored in the model storage unit 15, the abnormality detection unit 16 may detect an abnormality using the monitoring model stored in the model storage unit 15. Further, the captured image applied to the monitoring model is preferably the latest captured image acquired by the captured image acquisition unit 11. The abnormality detection unit 16 can acquire the presence or absence of abnormality related to the monitoring target included in the captured image by applying the captured image to the monitoring model. Furthermore, the abnormality detection unit 16 may also specify the type of the detected abnormality (for example, a fire, a fall of a person, a traffic accident, or the like). Note that detection of abnormality using the monitoring model will be described later.

Here, the abnormality of the detection target corresponding to each type of the monitoring target will be briefly described. The abnormality to be detected when the monitoring target is a road may be, for example, a traffic accident, a tumbling of a person, a fire, a riot, a wrong-way-driving of an automobile, or the like. The abnormality to be detected in a case where the monitoring target is outside the building may be, for example, a fire, an illegal intrusion, a riot, falling of a person, or the like. The abnormality to be detected when the monitoring target is inside the building may be, for example, a fire, a violent act, failing of a person, or the like. The abnormality to be detected in a case where the monitoring target is a shopping street may be, for example, fire, riots, tumbling of a person, shoplifting, seizing, graffiti, or the like. The abnormality to be detected when the monitoring target is a river may be, for example, flooding, drowning, or the like. The abnormality to be detected in a case where the monitoring target is the sea may be, for example, abnormal weather such as tsunami and tornado, a drowner, a wrecked ship, or the like. The abnormality to be detected when the monitoring target is a mountain may be, for example, an abnormal weather such as a fire or a tornado.

When an abnormality is detected by the abnormality detection unit 16, the output unit 17 performs an output related to the detection of the abnormality. The output related to the detection of the abnormality may be, for example, an output indicating that the abnormality is detected, or may be an output for performing predetermined processing corresponding to the detection of the abnormality. Examples of the latter include automatically activating fire extinguishing equipment such as sprinklers when a fire is detected. The output indicating that the abnormality is detected may be, for example, transmission indicating that the abnormality is detected to a transmission destination registered in advance. For example, the detection of the abnormality may be transmitted to an administrator of the monitoring device 1 or a public institution such as a police department or a fire department. Further, the output target may include, for example, a type of abnormality (for example, abnormal weather such as fire, traffic accident, tumbling, riots, tornados, flooding of rivers, tsunami of the sea, and the like), and may include information indicating an occurrence place of the abnormality (for example, the address, latitude, longitude, and the like of the position where the monitoring device 1 is installed). The information indicating the occurrence place of the abnormality may be acquired by, for example, a position acquisition unit (for example, a position acquisition unit using a GPS, and the like) not illustrated included in the monitoring device 1, or may be stored in advance in a recording medium included in the monitoring device 1.

Furthermore, the output unit 17 may perform output for attaching a label corresponding to the detected abnormality to the captured image. For example, in a case where an abnormality of riots is detected in a captured image at a certain time point, the output unit 17 may give a riot label to the captured image at that time point. By providing such a label, it is possible to easily confirm the captured image, sound, and the like at the time when the abnormality is detected later.

Here, this output may be, for example, transmission via a communication line, audio output by a speaker, accumulation on a recording medium, display on a display device, or delivery to another component. Note that the output unit 17 mayor may not include a device that performs output (for example, a communication device or the like). Furthermore, the output unit 17 may be realized by hardware, or may be realized by software such as a driver that drives these devices.

Note that the captured image storage unit 12 and the model storage unit 15 may be implemented by, for example, the same recording medium, or may be implemented by separate recording media. In the former case, an area storing the captured image serves as the captured image storage unit 12, and an area storing the monitoring model serves as the model storage unit 15.

Next, a monitoring model and abnormality detection using the monitoring model will be described.

The monitoring model may be, for example, a learning device that is a result of supervised machine learning, or may be another model. In the present exemplary embodiment, a case where the monitoring model is a learning device will be mainly described, and monitoring models other than the learning device will be described later. The monitoring model, which is a learning device, may be a learning device learned using a plurality of sets of training input information, which is a captured image, and training output information indicating the presence or absence of abnormality related to the monitoring target included in the captured image of the training input information. This learning device may be, for example, a learning result of a neural network or a learning result of another machine learning. In the present exemplary embodiment, a case where the learning device is a learning result of the neural network will be mainly described. In addition, a set of the training input information and the training output information may be referred to as training information.

The neural network may be, for example, a neural network having a convolution layer, a neural network including a fully connected layer, or other neural networks. Further, in a case where the neural network has at least one intermediate layer (hidden layer), the learning of the neural network may be considered to be deep learning (Deep Learning). Furthermore, in a case where a neural network is used for machine learning, the number of layers of the neural network, the number of nodes in each layer, the type of each layer (for example, a convolution layer, a fully connected layer, etc.), and the like may be appropriately selected. In addition, in each layer, a bias may or may not be used. Whether to use the bias may be independently determined for each layer. Furthermore, a softmax layer may be provided on a preceding stage of the output layer. Note that the number of nodes in the input layer and the output layer is usually determined by the number of pieces of information of the training input information and the number of pieces of information of the training output information included in the training information.

Further, the neural network may be, for example, a neural network having a configuration similar to that used for object recognition. The neural network may include, for example, a plurality of convolution layers at a subsequent stage of the input layer. Note that the neural network may or may not include one or more pooling layers. Furthermore, the number of continuous convolution layers included in the neural network is not limited. For example, the neural network may have three or more continuous convolution layers, or may have five or more continuous convolution layers.

In addition, padding may be appropriately performed in each layer of the neural network. The padding may be, for example, zero padding, padding for extrapolating the pixel value of the outermost periphery of the image, or padding for obtaining the pixel value folded back at each side of the image.

Further, the stride in each layer is not limited, but for example, the stride in the convolution layer is preferably a small value such as 1 or 2, and in a case where the neural network has a pooling layer, the stride of the pooling layer is preferably 2 or more.

Furthermore, each setting in the neural network may be as follows. The activation function may be, for example, ReLU (normalized linear function), may be a sigmoid function, or may be another activation function. Further, in the learning, for example, an error back propagation method may be used, or a mini-batch method may be used. Furthermore, the loss function (error function) may be a mean square error. Furthermore, the number of epoch (the number of parameter updates) is not particularly limited, but it is preferable to select the number of epoch that is not excessively adapted. In addition, in order to prevent excessive adaptation, dropout may be performed between predetermined layers. Note that a known method can be used as a learning method in machine learning, and a detailed description thereof will be omitted.

Storing the learning device in the model storage unit 15 may be, for example, that the learning device itself (for example, a function that outputs a value to an input, a model of a learning result, or the like) is stored or that information such as parameters necessary for configuring the learning device is stored. Even in the latter case, since the learning device can be configured using the information such as the parameter, it can be considered that the learning device is substantially stored in the model storage unit 15. In the present exemplary embodiment, a case where the learning device itself is stored in the model storage unit 15 will be mainly described.

Here, generation of the learning device will be described. As described above, the training input information is the captured image. The size (for example, the number of vertical and horizontal pixels) of the captured image may be determined. In a case where the actual captured image is different from a predetermined size, enlargement or reduction of the image, adjustment of the aspect ratio by adding a pixel having no information, and the like may be appropriately performed. The training output information may be information indicating the presence or absence of abnormality related to the monitoring target included in the captured image that is the training input information paired with the training output information. Specifically, the training output information may be information that is "1" in a case where abnormality is included in the training input information to be paired, and may be information that is "0" in a case where abnormality is not included. Further, the training output information may also be information indicating a type of abnormality. Specifically, in a case where the abnormality of the type A is included in the training input information to be paired, the training output information may be information in which the value of the node corresponding to the type A is "1" and the values of the other nodes are "0". Furthermore, in a case where the abnormality of the type B is included in the training input information to be paired, the training output information may be information in which the value of the node corresponding to the type B is "1" and the values of the other nodes are "0".

For example, a learning device is manufactured by preparing a set of training input information that is a captured image of a monitoring target in which an abnormality has occurred and training output information that indicates the presence of the abnormality or a type of the abnormality, or a set of training input information that is a captured image of a monitoring target in which no abnormality has occurred and training output information that indicates the absence of the abnormality, and learning a plurality of sets of the prepared training input information and training output information. The captured image as the training input information may be, for example, a captured image of a building in which a fire has occurred, a captured image of a traffic accident site, or the like. Note that, since it is considered difficult to prepare a large amount of training input information in which an abnormality has occurred, the training input information may be artificially created by, for example, computer graphics or the like. For example, a captured image of a building in which a fire has occurred may be created by combining a captured image of a building in which no fire has occurred with a captured image of flame, smoke, or the like. Further, in a case where it is difficult to prepare the training input information in which an abnormality has occurred, for example, learning may be performed using training information of a situation in which no abnormality has occurred. Then, the abnormality may be detected in a case where the output from the learning device when the captured image is input to the learning device (monitoring model) which is such a learning result largely deviates from the training output information. Furthermore, as the learning device, for example, a known learning device may be used.

When the captured image acquired by the captured image acquisition unit 11 is applied to the monitoring model that is the learning device generated by learning the plurality of pieces of training information as described above, information indicating the presence or absence of abnormality related to the monitoring target included in the captured image can be acquired. Specifically, when the captured image is input to the learning device, a value of 0 to 1 is output from the node of the output layer. This value is a so-called certainty factor (likelihood). For example, if the value is close to 1, there is a high possibility that an abnormality has occurred in the monitoring target. Therefore, when a value close to 1 (for example, a value exceeding a predetermined threshold value) is output from the learning device, it may be determined that an abnormality has been detected. Note that, in a case where the output layer has the number of nodes corresponding to the type of abnormality, the type of abnormality can be known according to which node has output a value close to 1.

Note that, in the above description, the input information to the learning device is one captured image, but the input information may not be one captured image. For example, a plurality of temporally continuous captured images, that is, a plurality of captured images constituting a moving image may be input information to the learning device. In this case, for example, a learning result of a three-dimensional convolutional RNN obtained by combining a convolutional neural network and a recurrent neural network (RNN) may be used as the learning device. It is known that a moving image can be recognized by using such a three-dimensional convolutional RNN. Note that the moving image may be recognized using a model other than the three-dimensional convolutional RNN. For details of the three-dimensional convolutional RNN, refer to, for example, the following literature.

Literature: Satoshi Asatani, Seiichi Tagawa, Hirohiko Niioka, Jun Miyake, "Proposal of three-dimensional convolutional RNN for moving image recognition", The Special Interest Group Technical Reports of Information Processing Society of Japan, Vol. 2016-CVIM-201, No. 6, 1-4, Feb. 25, 2016

Furthermore, one monitoring model may include, for example, one learning device or a plurality of learning devices. For example, a monitoring model for detecting an abnormality related to the outside of a building may include a learning device for detecting a fire and a learning device for detecting trespassing.

Note that in the present exemplary embodiment, the case where the monitoring model is the learning device has been mainly described, but the monitoring model may not be the learning device. The monitoring model may include, for example, a learning device and other models, or may include only models other than the teaming device. As a monitoring model including a teaming device and other models, for example, there is a monitoring model that detects a person in a moving image, estimates a skeleton of the detected person, and detects the presence or absence of violent behavior, the presence or absence of shoplifting, and the like on the basis of a result of the skeleton estimation. In such a monitoring model, for example, a teaming device may be used for detection of a person or skeleton estimation. Further, the learning device may also be used to detect the presence or absence of violent behavior, the presence or absence of shoplifting, and the like based on the result of skeleton estimation. Furthermore, examples of the monitoring model including only a model other than the learning device include a model that detects smoke without using the learning device as in Patent Literature 1 described above. In a case where the monitoring model includes a device other than the learning device, applying the captured image to the monitoring model may be, for example, executing abnormality detection processing using the monitoring model on the captured image.

Next, the operation of the monitoring device 1 will be described with reference to a flowchart of FIG. 2.

(Step S101) The captured image acquisition unit 11 determines whether to acquire a captured image. Then, when the captured image is acquired, the process proceeds to step S102, and otherwise, the process proceeds to step S103. For example, the captured image acquisition unit 11 may periodically determine that the captured image is acquired.

(Step S102) The captured image acquisition unit 11 acquires a captured image and accumulates the captured image in the captured image storage unit 12. Then, the process returns to step S101.

(Step S103) The determination unit 13 determines whether to make a determination related to the type of the monitoring target. Then, the process proceeds to step S104 when the determination is made, otherwise the process proceeds to step S106. Note that, in a case where the camera that captures the captured image is fixed, the determination unit 13 may determine to perform determination when acquisition of the captured image is started. On the other hand, in a case where the camera that captures the captured image is movable, for example, the determination unit 13 may periodically determine to perform the determination, or may determine to perform the determination when more than the predetermined movement is performed.

(Step S104) The determination unit 13 determines the type of the monitoring target included in the latest captured image. The determination result may be stored in a recording medium (not illustrated).

(Step S105) The model acquisition unit 14 acquires the monitoring model corresponding to the determination result of step S104 from the server and accumulates the monitoring model in the model storage unit 15. Then, the process returns to step S101. Note that when the determination by the determination unit 13 is repeated, the monitoring model to be acquired may already be stored in the model storage unit 15. In this case, the model acquisition unit 14 may change the monitoring model stored in the model storage unit 15 such that the information indicating the model to be used (For example, a flag or the like) corresponds to the determination result without acquiring the monitoring model.

(Step S106) The abnormality detection unit 16 determines whether to detect an abnormality. Then, in a case where an abnormality is detected, the process proceeds to step S107, and otherwise, the process returns to step S101. Note that for example, the abnormality detection unit 16 may periodically determine that the abnormality is detected, or may determine that the abnormality is detected every time new imaging information is acquired.

(Step S107) The abnormality detection unit 16 applies the latest captured image to the monitoring model stored in the model storage unit 15 to acquire the presence or absence of abnormality related to the monitoring target included in the captured image. Note that, in a case where a plurality of monitoring models is stored in the model storage unit 15, for example, a monitoring model acquired most recently may be used for abnormality detection, or a monitoring model indicating a use target may be used for abnormality detection.

(Step S108) In step S107, the output unit 17 determines whether an abnormality is detected. Then, in a case where an abnormality is detected, the process proceeds to step S109, and otherwise, the process returns to step S101.

(Step S109) The output unit 17 performs output related to abnormality detection. Then, the process returns to step S101.

Figure 2:
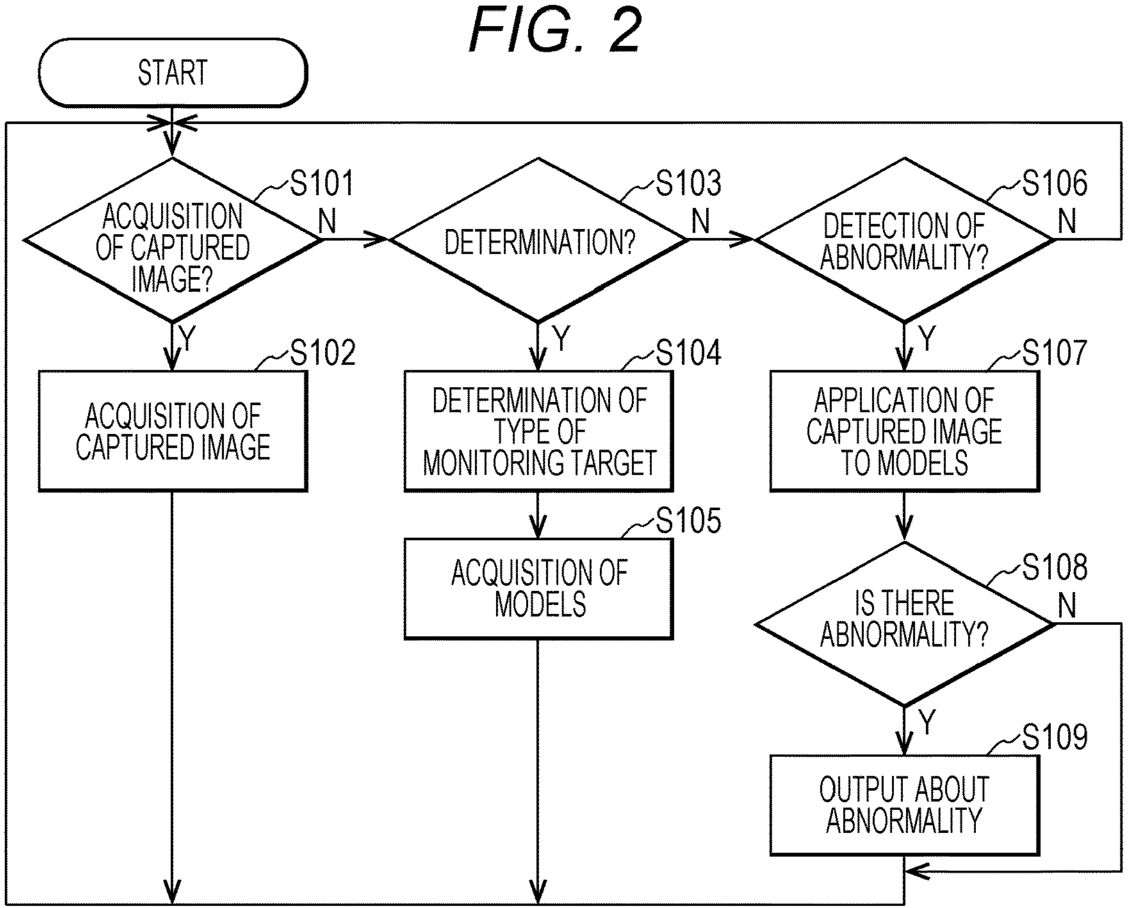
FIG. 2 is a flowchart illustrating an operation of the monitoring device according to the exemplary embodiment.

Note that the order of processing in the flowchart of FIG. 2 is an example, and the order of each step may be changed as long as a similar result can be obtained. In addition, in the flowchart of FIG. 2, the processing is ended by interruption of power off or processing end.

Next, an operation of monitoring device 1 according to the present exemplary embodiment will be described with reference to a specific example.

Figure 3A:
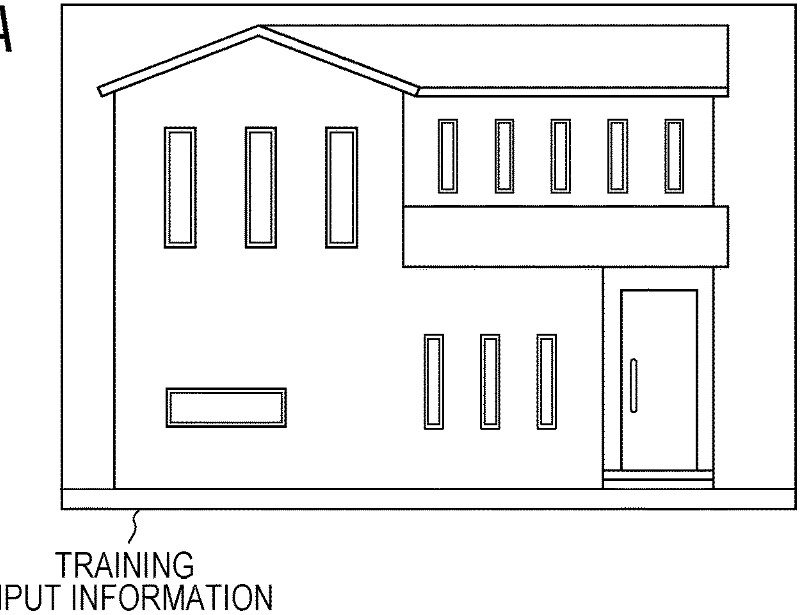
FIG. 3A is a diagram illustrating an example of training input information according to the exemplary embodiment.
Figure 3B:
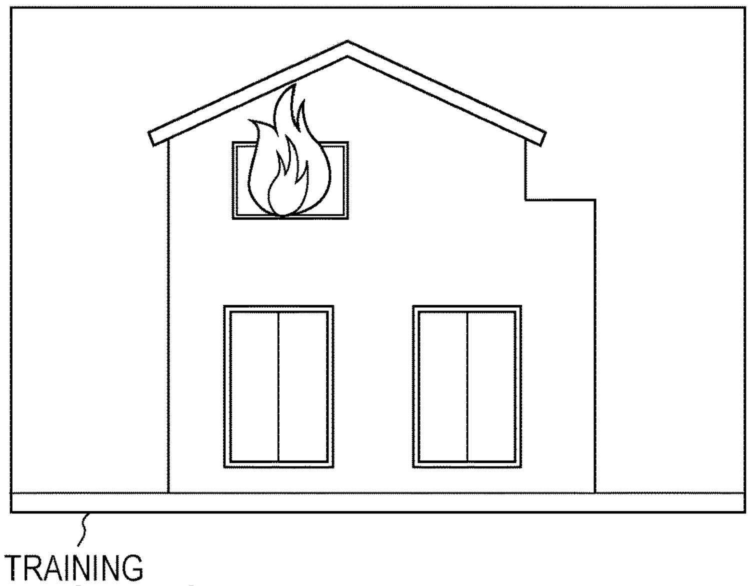
FIG. 3B is a diagram illustrating an example of training input information according to the exemplary embodiment.

First, creation of a monitoring model that is a learning device will be briefly described. In order to perform machine learning for creating a learning device, a plurality of pieces of training information is prepared. For example, training information that is a set of training input information that is a captured image of the appearance of the house illustrated in FIG. 3A and training output information indicating that there is no abnormality, training information that is a set of training input information that is a captured image of the appearance of the house illustrated in FIG. 3B and training output information indicating that there is abnormality, and the like are prepared. Note that a fire has occurred in the captured image illustrated in FIG. 3B. Therefore, the training output information paired with the training input information of FIG. 38 may indicate that a fire has occurred. By performing learning using such a plurality of pieces of training information, it is possible to generate a monitoring model for detecting an abnormality related to the outside of the house. For the inside of a house, a road, a shopping street, a river, and the like, which are other monitoring targets, a monitoring model can be similarly generated. The plurality of monitoring models thus generated are held in the server.

Thereafter, it is assumed that the monitoring device 1 illustrated in FIG. 4 is installed toward the house to be monitored and the monitoring device 1 is powered on. Note that, in the monitoring device 1 illustrated in FIG. 4, each configuration illustrated in FIG. 1 is arranged inside a housing, and the captured image acquisition unit 11 is assumed to be a camera that captures a captured image. When the power is turned on, it is assumed that the captured image acquisition unit 11 of the monitoring device 1 starts capturing, acquires the captured image illustrated in FIG. 5A, and accumulates the captured image in the captured image storage unit 12 (steps S101 and S102). Then, the determination unit 13 makes a determination related to the type of the monitoring target included in the captured image (steps S103 and S104). It is assumed that the determination is made using a learning device. Then, as a result of the determination, it is assumed that the certainty factor of the types "house (outside)" and "road" of the monitoring target exceeds a predetermined threshold value. Then, the determination unit 13 passes the types "house (outside)" and "road" of the monitoring target, which are the determination results of the monitoring target, to the model acquisition unit 14. Upon receiving the determination result, model acquisition unit 14 refers to information in FIG. 6A stored in a recording medium (not illustrated) that associates the type of the monitoring target with the model identifier, and identifies model identifiers "M003" and "M001" respectively corresponding to the types "house (outside)" and "road" of the monitoring target that are the determination result. Then, the model acquisition unit 14 transmits the transmission instruction of the monitoring model corresponding to the model identifiers "M003" and "M001" to the server address held in advance as the transmission destination. In response to the transmission, the model acquisition unit 14 receives the monitoring model for the outside of the house and the monitoring model for the road corresponding to the model identifiers "M003" and "M001" transmitted from the server, and accumulates the models in the model storage unit 15 (step S105).

Thereafter, the abnormality detection unit 16 acquires the presence or absence of abnormality regarding the outside of the house and the road by periodically applying the latest captured image stored in the captured image storage unit 12 to the monitoring model for the outside of the house and the monitoring model for the road (steps S106 and S107). Then, in a case where there is an abnormality, the output unit 17 transmits information indicating that the abnormality has occurred to a predetermined device (For example, the installer or the like of the monitoring device 1) (steps S108 and S109).

As described above, the monitoring device 1 according to the present exemplary embodiment can detect an abnormality using the monitoring model corresponding to the type of the monitoring target included in the captured image. Therefore, it is possible to detect abnormalities related to various monitoring targets by using the monitoring device 1 without preparing a device corresponding to the purpose of monitoring. Further, even if a person does not confirm the captured image, abnormality can be automatically detected. Furthermore, since the monitoring model corresponding to the type of the monitoring target included in the captured image is used, it is possible to implement abnormality detection with higher accuracy than general-purpose abnormality detection with a lighter load. Furthermore, since the monitoring model according to the determination result can be acquired by the model acquisition unit 14, only the currently used monitoring model can be stored in the model storage unit 15. By doing so, the storage capacity of the model storage unit 15 may be smaller.

Next, a modification example of the monitoring device 1 according to the present exemplary embodiment will be described.

[Detection of Abnormality for Each Part of Captured Image]

When the number of types of the monitoring target determined to be included in the captured image by the determination unit 13 is plural, the abnormality detection unit 16 may detect the abnormality using the monitoring model corresponding to the type of the monitoring target for each part of the captured image corresponding to each type of the monitoring target that is the determination result. More specifically, in the captured image, a part corresponding to each type of the monitoring target that is the determination result may be specified. Then, the abnormality detection unit 16 may detect an abnormality using a monitoring model corresponding to the type of the monitoring target corresponding to the specified part for the specified part. For example, when two types of monitoring targets "house (outside)" and "road" are included as in the captured image illustrated in FIG. 5A, as illustrated in FIG. 5B, abnormality detection using a monitoring model corresponding to the type "house (outside)" of the monitoring target may be performed for a part R101 corresponding to the type "house (outside)" of the monitoring target, and abnormality detection using a monitoring model corresponding to the type "road" of the monitoring target may be performed for a part R102 corresponding to the type "road" of the monitoring target.

The part of the captured image corresponding to the type of the monitoring target may be specified by, for example, image segmentation. In this case, for example, a rectangular region including the region of the building specified by the image segmentation may be set as the part R101 corresponding to the type "house (outer side)" of the monitoring target. Further, for example, a rectangular region including the region of the road and the automobile specified by the image segmentation may be set as the part R102 corresponding to the type "road" of the monitoring target. Note that, in a case where the image segmentation is performed by the determination unit 13, the part of the captured image corresponding to the type of the monitoring target may be specified using the result of the image segmentation. Furthermore, the specific identification of the part of the captured image corresponding to the type of the monitoring target may be performed by, for example, the abnormality detection unit 16 or the determination unit 13. In addition, the determination unit 13 may perform determination on various areas (for example, each region obtained by dividing the captured image into four equal parts, and the like) included in the captured image, and an area having the highest certainty factor regarding the type of a certain monitoring target may be specified as a part of the type of the monitoring target.

As described above, abnormality detection using the monitoring model corresponding to the type of the monitoring target is performed for each part of the captured image corresponding to each type of the monitoring target that is the determination result, whereby abnormality detection with higher accuracy can be performed.

[More Detailed Monitoring Model]

Figures 6B, 7:
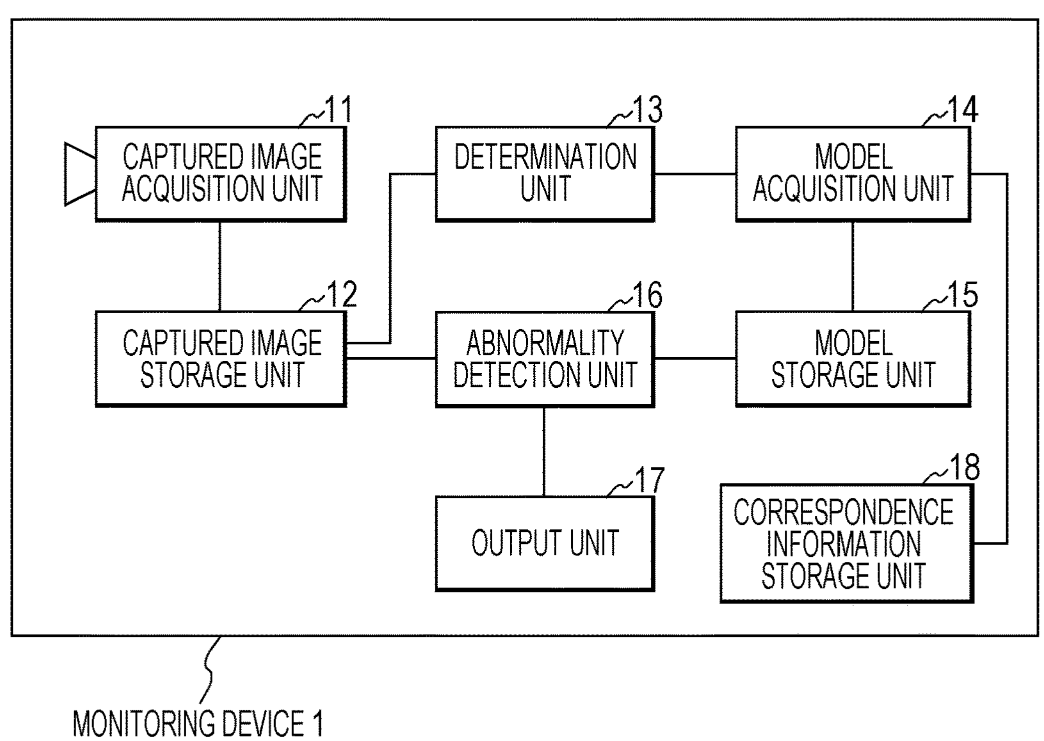
FIG. 6B is a diagram illustrating an example of correspondence between a type of a monitoring target and a model identifier according to the exemplary embodiment.
FIG. 7 is a block diagram illustrating another configuration of the monitoring device according to the exemplary embodiment.

The monitoring model used for abnormality detection may correspond to each attribute in the type of the monitoring target. In this case, for example, as illustrated in FIG. 6B, the type of the monitoring target may include a plurality of attributes, and the type and attribute of the monitoring target may be associated with the monitoring model. Specifically, the type "road" of the monitoring target has attributes "one lane", "two lanes", "four lanes", and the like related to the lane, and the monitoring model is set for each attribute. In this case, the determination unit 13 preferably performs determination related to the type of the monitoring target including the attribute. Then, the abnormality detection unit 16 detects an abnormality using the monitoring model corresponding to the type and attribute of the monitoring target. For example, when the determination unit 13 determines that the type and attribute of the monitoring target included in the captured image are the four-lane road, the abnormality detection unit 16 detects an abnormality using the monitoring model identified by the model identifier "M103" corresponding to the four-lane road. In this way, it is possible to detect an abnormality with higher accuracy according to the type and attribute of the monitoring target. Note that the attribute may be any attribute. For example, the type "house (outer side)" of the monitoring target may have attributes "wood", "steel frame", "reinforced concrete", and the like of the structure of the house.

Further, monitoring models corresponding to two or more types of monitoring targets may also be used for abnormality detection. For example, a monitoring model corresponding to the outside of a building and a road, a monitoring model corresponding to the outside of a building and a river, or the like may be used. In this case, for example, when the determination unit 13 determines that the captured image includes the outside of the building and the road, the abnormality detection unit 16 may detect an abnormality using a monitoring model corresponding to the outside of the building and the road. This makes it possible to detect abnormality with higher accuracy. Note that, as the monitoring models corresponding to two or more types of monitoring targets, a plurality of monitoring models corresponding to distances and positional relationships (for example, a positional relationship in which there is a building above and there is a road below, a positional relationship in which there is a building on the left and there is a road on the right, and the like) between two or more types of monitoring targets may be prepared. Then, a monitoring model corresponding to a distance, a positional relationship, or the like between two or more types of monitoring targets included in the captured image may be used for abnormality detection.

Furthermore, a monitoring model corresponding to an attribute of a monitoring target in a captured image, for example, a positional relationship or a size may also be used for abnormality detection. For example, as described above, in a case where a part corresponding to the type of the monitoring target is specified in the captured image, when the specified part (region) corresponding to the type of the monitoring target is on the near side (that is, the side close to the camera), the monitoring model corresponding to the near side may be used, and when the specified part (region) is on the far side (that is, the side far from the camera), the monitoring model corresponding to the far side may be used. In that case, it may be determined whether it is the near side or the far side according to the position of the part in the captured image. For example, it is considered that at least a part of a monitoring target present in the back side part is often hidden by an object present in the front side part. Therefore, it is preferable that the monitoring model used for the monitoring target present in the back side part can appropriately detect an abnormality even if a part is hidden by an object present in the front side part. Further, for example, as described above, in a case where a part corresponding to the type of the monitoring target is specified in the captured image, different monitoring models may be used when the size of the specified part corresponding to the type of the monitoring target is larger than a threshold value and when the size is not larger than the threshold value. For example, it is considered that a monitoring target present in a part whose size is smaller than the threshold value usually has a low resolution in many cases. Therefore, it is preferable that the monitoring model used for the monitoring target present in the part where the size is smaller than the threshold value can appropriately detect an abnormality even in an image having a low resolution.

[Detection of Abnormality Using Monitoring Model Corresponding to Abnormality of Detection Target]

In the present exemplary embodiment, the case where the monitoring model exists for each type of the monitoring target has been mainly described, but the monitoring model may not exist. The monitoring model may correspond to an abnormality of the detection target. The monitoring model corresponding to the abnormality of the detection target may be, for example, a monitoring model for detecting fire or smoke, a monitoring model for detecting a traffic accident, a monitoring model for detecting shoplifting, a monitoring model for detecting riots, a monitoring model for detecting tumbling, a monitoring model for detecting abnormal weather such as tornados, or the like.

In this case, as illustrated in FIG. 7, the monitoring device 1 may further include a correspondence information storage unit 18 that stores a plurality of pieces of correspondence information. The correspondence information is information that associates the type of the monitoring target with the abnormality of one or more detection targets. For example, as illustrated in FIG. 8A, the correspondence information may be information in which a type "road" of the monitoring target is associated with abnormality "tumbling", "traffic accident". "riots", "fires", or the like of the detection target.

Note that the process of storing the plurality of pieces of correspondence information in the correspondence information storage unit 18 is not limited. For example, a plurality of pieces of correspondence information may be stored in the correspondence information storage unit 18 via a recording medium, a plurality of pieces of correspondence information transmitted via a communication line or the like may be stored in the correspondence information storage unit 18, or a plurality of pieces of correspondence information input via an input device may be stored in the correspondence information storage unit 18. Further, the correspondence information storage unit 18 is preferably realized by a nonvolatile recording medium, but may be realized by a volatile recording medium. The recording medium may be, for example, a semiconductor memory, a magnetic disk, an optical disk, or the like.

Furthermore, "associate the type of the monitoring target with the abnormality of one or more detection targets" means that it is sufficient if an abnormality of one or more detection targets can be specified from the type of the monitoring target. Therefore, the correspondence information may be, for example, information including the type of the monitoring target and the abnormality of the detection target as a set, or may be information linking the type of the monitoring target and the abnormality of the detection target.

In this case, a monitoring model may be prepared for each abnormality "tumbling", "traffic accident", or the like of the detection target. Furthermore, in this case, for example, as illustrated in FIG. 8B, the monitoring model corresponding to the type of the abnormality of the detection target may be specified by the information associating the abnormality of the detection target with the model identifier.

Then, the abnormality detection unit 16 may detect an abnormality using one or more monitoring models associated with the type of the monitoring target determined by the determination unit 13 by the correspondence information stored in the correspondence information storage unit 18. For example, when it is determined that the type of the monitoring target included in the captured image is "road", the model acquisition unit 14 may specify an abnormality "tumbling", "traffic accident", or the like of the detection target corresponding to the type "road" of the monitoring target using the correspondence information illustrated in FIG. 8A, specify model identifiers "M301", "M302", and the like corresponding to the specified abnormality of the detection target using the information illustrated in FIG. 8B, and acquire the monitoring model identified by the specified model identifier from the server. Then, the abnormality detection unit 16 may detect an abnormality using the monitoring model acquired as described above.

As described above, since the monitoring model corresponds to the abnormality of the detection target, it is not necessary to prepare the monitoring model for each monitoring target. For example, a monitoring model for detecting a fire can be used for monitoring a road, monitoring a building, monitoring a shopping street, and the like, and a burden for preparing the monitoring model can be reduced as compared with a case where the monitoring model is prepared for each monitoring target.

Here, the monitoring model for each abnormality of the detection target will be briefly described.

For monitoring models for detecting riots and violent acts, see, for example, the following literature.

Literature: Amarjot Singh, Devendra Patil, S N Omkar, "Eye in the Sky: Real-time Drone Surveillance System (DSS) for Violent Individuals Identification using ScatterNet Hybrid Deep Learning Network", IEEE Conference on Computer Vision and Pattern Recognition (CVPR) 2018.

Note that it is considered that it is also possible to detect sexual and mental harassments accompanied by actions by using a model similar to the model for detecting riots and violent acts.

For a monitoring model for detecting suspicious behavior such as shoplifting, see, for example, the following literature.

Literature: JP6534499 B2

For a monitoring model for detecting smoke, see, for example, Patent Literature 1.

For a monitoring model for detecting a fall, see, for example, the following literature.

Literature: Yoshiyuki Kobayashi, Takafumi Yanagisawa, Hidenori Sakanashi, Hirokazu Nosato, Eiichi Takahashi, Masaaki Mochimaru, "Study on Evaluation of Abnormality Detection Technology Aiming at Clarification of Actual State of Falling in Public Space", Japanese Journal of Fall Prevention, 1(1), p. 55-63, June 2014.

For monitoring models for detecting traffic accidents, see, for example, the following website and literature.

Website: URL <https://www.fujitsu.com/jp/solutions/business-technology/mobility-solution/spatiow12/traffic-video-analysis/>

Literature: JP 2017-091530 A.

[Detection of Abnormality Also Using Sound]

In a case where sound is also included in the captured image, the abnormality detection unit 16 may detect an abnormality also using sound. In this case, for example, abnormality detection such as sexual misconduct, mental misconduct, and bribe exchange may be performed using a voice. Further, in this case, for example, the type of the monitoring target "inside of a house" or "inside of a building" may be associated with an abnormality of the detection target "sexual misconduct", "mental misconduct", "bribe exchange", or the like.

In a case where a voice is also used for abnormality detection, for example, the voice may be input to a model for voice recognition (It may be a neural network such as RNN, or it may be other models), and a predetermined phrase may be included in a voice recognition result that is an output of the voice recognition result, and the abnormality may be detected in a case where at least one of a person who has uttered the voice and a person who is listening to the voice is performing a predetermined operation. In this case, for example, a model may be used for voice recognition or motion recognition. Then, the abnormality may be detected in a case where the character string that is the voice recognition result includes one that matches any of the plurality of predetermined phrases or one that is similar to any of the plurality of predetermined phrases by a threshold or more, and at least one of the speaker and the person who is not the speaker performs an operation that matches any of the plurality of predetermined operations or an operation that is similar to any of the plurality of predetermined operations by a threshold or more. Whether or not the predetermined motion has been performed may be determined, for example, by detecting a person in a moving image, performing skeleton estimation regarding the detected person, and using a result of the skeleton estimation.

More specifically, the abnormality may be detected as follows. For example, in a case where an utterer who is a male utters "THREE SIZE?" while beating a shoulder of another person who is a female, an abnormality that is sexual abuse may be detected. Further, for example, in a case where an utterer says "DEAD!" while pointing to another person, an abnormality that is mental abuse may be detected. Furthermore, for example, in a case where an utterer says "OVERLOOK" while making a gesture indicating money (such as a gesture of rubbing a thumb, an index finger, and a middle finger) and another person hands over money to the utterer, an abnormality that is bribery may be detected. In this way, by also using a voice, it is possible to detect abnormality having a wider width. For example, even an abnormality that cannot be detected only by an operation can be detected by using a voice.

[Detection of Abnormality in Unattended Store]

The abnormality detection unit 16 may detect an abnormality in an unattended store. Abnormalities in the unattended store may be, for example, shoplifting, penniless eating and drinking, mixing of foreign substances into the food and drink to be sold, returning at least a part of the food and drink to the display shelf, and take-out of the food and drink in the case of the all you can eat or drink option. Such an abnormality may be detected, for example, by detecting a person or a food and drink in a moving image, estimating a skeleton of the detected person, and detecting the abnormality by using a result of the skeleton estimation or a result of detecting the food and drink.

[Output According to Certainty Factor Corresponding to Detected Abnormality]

The output unit 17 may perform different outputs according to the certainty factor corresponding to the abnormality detected by the abnormality detection unit 16. Specifically, in a case where the certainty factor corresponding to the detected abnormality is higher than a predetermined threshold value, the output unit 17 may output the fact that the abnormality has been detected to the administrator of the monitoring device 1 and a public organization (for example, police, fire department, and the like), and in a case where the certainty factor corresponding to the detected abnormality is lower than a predetermined threshold value, the output unit 17 may output the fact that the abnormality has been detected only to the administrator of the monitoring device 1. Note that, in a case where the certainty factor is less than a predetermined threshold value, it is considered that no abnormality has been detected, and the output may not be performed. In this manner, an output according to the likelihood of the detected abnormality can be performed. For example, in a case where the certainty factor is high, it is considered that there is a high possibility that an abnormality has actually occurred. Therefore, it is possible to minimize the damage by automatically making contact with a public institution or the like. On the other hand, for example, in a case where the certainty factor is not high, there is a possibility that no abnormality has occurred. Therefore, it is possible to avoid erroneous reporting to a public institution by contacting the public institution after confirmation by the administrator or the like. Specifically, as illustrated in FIG. 9, information for associating the range of the certainty factor with the output destination may be stored in a recording medium (not illustrated), and the output unit 17 may refer to the information to specify the output destination corresponding to the certainty factor of the detected abnormality. In FIG. 9, it is set such that, in a case where the certainty factor is 90% abnormal, the occurrence of abnormality is notified to the output destination phone numbers "06-1234-**" and "090-9876-" by automatic voice telephone, and in a case where the certainty factor is 60% or more and less than 90%, the occurrence of abnormality is notified only to the output destination phone number "090-9876-**" by automatic voice telephone.

Note that, in this case, since the processing using the certainty factor is performed, the monitoring model preferably outputs the certainty factor. Examples of the monitoring model that outputs the certainty factor include a learning device that is a learning result such as a neural network.

Further, the output unit 17 may perform different outputs depending on a time zone. For example, when an abnormality is detected at night, the output unit may transmit information indicating that an abnormality has occurred to the security company, and when an abnormality is detected other than at night, the output unit 17 may transmit information indicating that an abnormality has occurred to the administrator of the monitoring device 1. Furthermore, the output unit 17 may perform different outputs according to the content of the abnormality. For example, the output unit 17 may transmit information indicating that an abnormality has occurred to the police when illegal entry is detected, and may transmit information indicating that an abnormality has occurred to the fire department when a fire is detected.

[Monitoring Device not Including Model Acquisition Unit]

In the above exemplary embodiment, the case where the model acquisition unit 14 acquires the monitoring model from the server has been mainly described, but the model acquisition unit may not acquire the monitoring model. When a plurality of monitoring models held in the server is stored in the model storage unit 15, the monitoring model may not be acquired. In this case, the monitoring device 1 may not include the model acquisition unit 14. Further, the abnormality detection unit 16 may specify a monitoring model corresponding to the type of the monitoring target determined by the determination unit 13 in the model storage unit 15 and detect an abnormality using the specified monitoring model.

Note that, in the above exemplary embodiment, the case where the captured image acquisition unit 11 captures an image of the monitoring target has been mainly described, but the captured image acquisition unit may not capture the image of the monitoring target. The captured image acquisition unit 11 that does not perform capturing may receive the captured image via a communication line. In this case, the monitoring device 1 may detect an abnormality in captured images captured by two or more monitoring cameras. In a case where an abnormality is detected in captured images captured by two or more monitoring cameras, it is preferable that the determination unit 13, the model acquisition unit 14, and the abnormality detection unit 16 perform processing such as determination, acquisition of a monitoring model, and detection of an abnormality for each monitoring camera.

Further, in the above exemplary embodiment, each processing or each function may be realized by being centrally processed by a single device or a single system, or may be realized by being distributedly processed by a plurality of devices or a plurality of systems.

Furthermore, in the above-described exemplary embodiment, the information transfer performed between the respective constituent elements may be performed, for example, by outputting information by one constituent element and receiving information by the other constituent element in a case where two constituent elements that perform the information transfer are physically different, or may be performed by shifting from a phase of processing corresponding to one constituent element to a phase of processing corresponding to the other constituent element in a case where two constituent elements that perform the information transfer are physically the same.

Furthermore, in the above-described exemplary embodiment, information related to processing executed by each constituent element, for example, information received, acquired, selected, generated, transmitted, or received by each constituent element, information such as a threshold value, a mathematical expression, or an address used by each constituent element in processing, and the like may be temporarily or for a long period of time held in a recording medium (not illustrated) even if not specified in the above description. In addition, each component or an accumulation unit (not illustrated) may accumulate information in the recording medium (not illustrated). Further, reading of information from a recording medium (not illustrated) may be performed by each component or a reading unit (not illustrated).

Furthermore, in the above-described exemplary embodiment, in a case where information used in each component or the like, for example, information such as a threshold value, an address, various setting values, or the like used by each component in processing may be changed by the user, the user may or may not be allowed to appropriately change such information even if it is not clearly described in the above description. In a case where the user can change the information, the change may be realized by, for example, a reception unit (not illustrated) that receives a change instruction from the user, and a change unit (not illustrated) that changes the information according to the change instruction. The reception of the change instruction by the reception unit (not illustrated) may be, for example, reception from an input device, reception of information transmitted via a communication line, or reception of information read from a predetermined recording medium.

Further, in the above exemplary embodiment, when two or more components included in the monitoring device 1 have a communication device, an input device, or the like, the two or more components may physically have a single device, or may have separate devices.

Furthermore, in the above exemplary embodiment, each component may be configured by dedicated hardware, or a component that can be implemented by software may be implemented by executing a program. For example, each component can be implemented by a program execution unit such as a CPU reading and executing a software program recorded in a recording medium such as a hard disk or a semiconductor memory. At the time of execution, the program execution unit may execute the program while accessing the storage unit or the recording medium. Note that software that implements monitoring device 1 in the above exemplary embodiments is the following program. That is, this program is a program for causing a computer to execute: a step of determining a type of a monitoring target included in a captured image of the monitoring target by applying the captured image to a learning device for image classification; a step of detecting an abnormality by applying the captured image of the monitoring target to a monitoring model corresponding to the type of the monitoring target determined in the step of determining the type of the monitoring target, the monitoring model being used to detect an abnormality related to the monitoring target included in the captured image; and a step of, when the abnormality is detected in the step of detecting the abnormality, performing an output related to detection of the abnormality.

Note that in the program, the functions implemented by the program do not include functions that can be implemented only by hardware. For example, functions that can be implemented only by hardware such as a modem and an interface card in an acquisition unit that acquires information, an output unit that outputs information, and the like are not included in at least the functions implemented by the program.

Further, this program may be executed by being downloaded from a server or the like, or may be executed by reading a program recorded in a predetermined recording medium (for example, an optical disk such as a CD-ROM, a magnetic disk, a semiconductor memory, or the like). Furthermore, this program may be used as a program constituting a program product.

In addition, the number of computers that execute this program may be singular or plural. That is, centralized processing or distributed processing may be performed.

Figure 10:
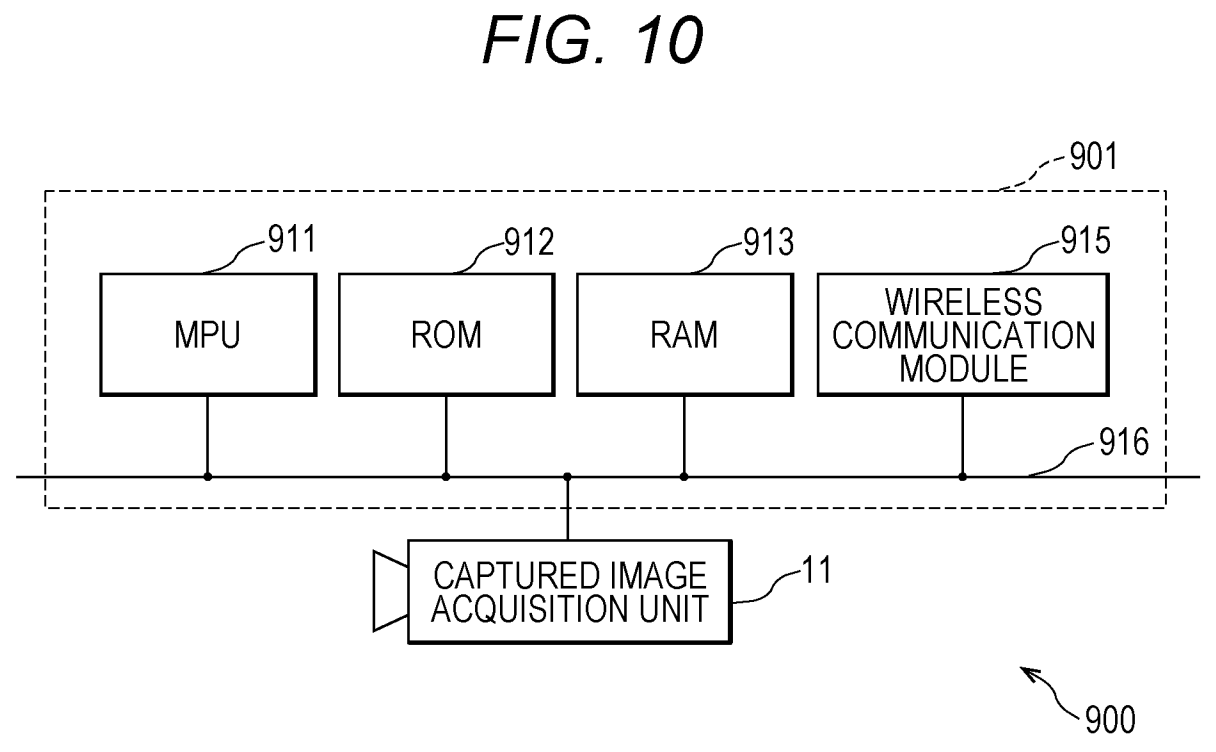

FIG. 10 is a diagram illustrating an example of a computer system 900 that executes the program to implement the monitoring device 1 according to the exemplary embodiment. The above exemplary embodiments can be implemented by computer hardware and a computer program executed on the computer hardware.

In FIG. 10, a computer system 900 includes a computer 901 including a micro processing unit (MPU) 911, a ROM 912 such as a flash memory in which programs such as a boot-up program, an application program, a system program, and data are stored, and a bus 916 that is connected to the MPU 911, temporarily stores an instruction of the application program, and interconnects a RAM 913 that provides a temporary storage space, a wireless communication module 915, the MPU 911, the ROM 912, and the like, and a captured image acquisition unit 11. Note that the computer 901 may include a wired communication module instead of the wireless communication module 915. Further, the computer 901 may include an input device such as a mouse, a keyboard, and a touch panel, a display device such as a display and a touch panel, and the like.

A program for causing the computer system 900 to execute the function of the monitoring device 1 according to the above exemplary embodiment may be stored in the ROM 912 via the wireless communication module 915. The program is loaded into the RAM 913 at the time of execution. Note that the program may be loaded directly from the network.

The program may not necessarily include an operating system (OS), a third-party program, or the like that causes the computer system 900 to execute the functions of the monitoring device 1 according to the above exemplary embodiment. The program may include only parts of instructions that invoke the appropriate functions or modules in a controlled manner, so that desired results are obtained. How the computer system 900 operates is well known, and a detailed description thereof will be omitted.

In addition, the present invention is not limited to the above exemplary embodiments, and various modifications can be made, and it goes without saying that these are also included in the scope of the present invention.

As described above, according to the monitoring device and the like of the present invention, it is possible to obtain an effect of detecting an abnormality using the monitoring model corresponding to the type of the monitoring target included in the captured image, and for example, it is useful as a monitoring device and the like that detect an abnormality such as a fire using the captured image.

The invention claimed is:

1. A monitoring device comprising:

a camera that repeatedly captures a captured image of a monitoring target;

a processor configured to:

determine a type of the monitoring target included in the captured image captured by the camera by applying the captured image to a learning device for image classification;

store a plurality of pieces of correspondence information for associating a type of the monitoring target with one or more types of abnormality of a detection target;

specify one or more types of abnormality of the detection target corresponding to the determined type of the monitoring target using the correspondence information;

detect one or more abnormalities by applying the captured image captured by the camera to one or more monitoring models that are respectively used to detect the specified one or more types of abnormality, each monitoring model being configured to detect a single type of abnormality related to the monitoring target included in the captured image, wherein each monitoring model is a learning device learned using a plurality of sets of training input information that is a captured image and training output information indicating presence or absence of an abnormality related to a monitoring target included in the captured image of the training input information; and output, when the abnormality is detected an output related to detection of the abnormality; and a moving platform operatively connected to the monitoring device to move the monitoring device.

2. The monitoring device according to claim 1, wherein the processor is configured to acquire one or more monitoring models corresponding to the type of the monitoring target from a server that holds the one or more monitoring models, wherein the processor is further configured to detect one or more abnormalities using the acquired one or more monitoring models.

3. The monitoring device according to claim 1, wherein the processor is configured to, when it is determined that a plurality of the types of the monitoring targets are included in the captured image, detect one or more abnormalities using a plurality of monitoring models respectively corresponding to the plurality of types of monitoring targets that are determination results.

4. The monitoring device according to claim 3, wherein the processor is configured to when it is determined that a plurality of the types of the monitoring targets are included in the captured image, detect, for each part of the captured image corresponding to each of the types of the monitoring targets that are determination results, a respective abnormality using a respective monitoring model corresponding to the type of the monitoring target and the respective abnormality.

5. The monitoring device according to claim 1, wherein the processor is further configured to output according to a certainty factor corresponding to the one or more abnormalities detected.

6. The monitoring device according to claim 1, wherein the captured image also includes sound, and the processor is configured to detect the one or more abnormalities by also using the sound included in the captured image.

7. A monitoring method comprising:

capturing repeatedly, by a camera, a captured image of a monitoring target;

determining repeatedly a type of a monitoring target included in the captured image captured in the step of capturing the captured image by applying the captured image to a learning device for image classification;

specifying one or more types of abnormality of a detection target corresponding to the determined type of the monitoring target using correspondence information, a plurality of pieces of correspondence information for associating a type of the monitoring target with one or more types of abnormality of a detection target being stored in a correspondence information storage;

detecting one or more abnormalities by applying the captured image captured in the step of capturing the captured image to one or more a monitoring models that are respectively used to detect the specified one or more types of abnormality, correspondence information with the type of the monitoring target determined in the step each monitoring model being configured to detect a single type of abnormality related to the monitoring target included in the captured image, wherein each monitoring model is a learning device learned using a plurality of sets of training input information that is a captured image and training output information indicating presence or absence of an abnormality related to a monitoring target included in the captured image of the training input information;

a step of, when the abnormality is detected in the step of detecting the abnormality, performing an output related to detection of the abnormality; and moving the camera by a moving platform.

8. A computer program product comprising a non-transitory computer-readable medium that when executed by a processor causes a computer to execute:

a step of repeatedly determining a type of a monitoring target included in a captured image of the monitoring target by applying the captured image to a learning device for image classification, wherein the captured image is repeatedly captured by a camera;

a step of specifying one or more types of abnormality of a detection target corresponding to the determined type of the monitoring target using correspondence information, a plurality of pieces of correspondence information for associating a type of the monitoring target with one or more types of abnormality of a detection target being stored in a correspondence information storage;

a step of detecting one or more abnormalities by applying the captured image of the monitoring target to one or more monitoring models that are respectively used to detect the specified one or more types of abnormality each monitoring model being configured to detect a single type of abnormality related to the monitoring target included in the captured image, wherein each monitoring model is a learning device learned using a plurality of sets of training input information that is a captured image and training output information indicating presence or absence of an abnormality related to a monitoring target included in the captured image of the training input information;

a step of, when the abnormality is detected in the step of detecting the abnormality, performing an output related to detection of the abnormality, and a step of moving the camera by controlling a moving platform.

* * * * *